United States Patent
Clark et al.

(10) Patent No.: US 10,452,201 B1
(45) Date of Patent: *Oct. 22, 2019

(54) TOUCH SENSOR FOR DISPLAY WITH SHIELD

(71) Applicant: Sharp Kabushiki Kaisha, Sakai, Osaka (JP)

(72) Inventors: Nick Clark, Oxford (GB); Tim Michael Smeeton, Oxford (GB)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/942,049

(22) Filed: Mar. 30, 2018

(51) Int. Cl.
*G06F 3/041* (2006.01)
*G09G 3/36* (2006.01)
*G06F 3/044* (2006.01)

(52) U.S. Cl.
CPC ............ *G06F 3/0418* (2013.01); *G06F 3/044* (2013.01); *G06F 3/0412* (2013.01); *G06F 2203/04107* (2013.01); *G06F 2203/04112* (2013.01)

(58) Field of Classification Search
CPC .............. G06F 3/0418; G06F 3/044; G06F 2203/04107; G06F 3/045; G06F 2203/04103; G06F 2203/04112
See application file for complete search history.

(56) References Cited

U.S. PATENT DOCUMENTS

| | | | |
|---|---|---|---|
| 8,922,512 B2 | 12/2014 | Cok | |
| 9,158,420 B2 | 10/2015 | Cok | |
| 9,342,176 B2 | 5/2016 | Kim et al. | |
| 9,459,751 B2 | 10/2016 | Weaver et al. | |
| 9,471,167 B2 | 10/2016 | Lai et al. | |
| 9,696,835 B2 | 7/2017 | Her | |
| 2016/0209958 A1 | 7/2016 | Choi et al. | |
| 2017/0350771 A1* | 12/2017 | Chern | G01L 1/144 |

OTHER PUBLICATIONS

Clark et al., "Touch Sensor Feedlines for Display", U.S. Appl. No. 15/942,036, filed Mar. 30, 2018.
Clark et al., "Touch Sensor for Display", U.S. Appl. No. 15/942,060, filed Mar. 30, 2018.
Mark et al., "Touch Sensor for Display With Improved Viewing Angle Uniformity", U.S. Appl. No. 15/942,064, filed Mar. 30, 2018.

* cited by examiner

*Primary Examiner* — Nelson M Rosario
(74) *Attorney, Agent, or Firm* — Keating & Bennett, LLP (57) ABSTRACT

A display device includes a display panel including a plurality of sub-pixels; a shield electrode that is made of a first conductive and opaque material, is located directly on the display panel, overlaps a portion of the display panel in between a portion of the plurality of sub-pixels, and is connected to a touch sensor controller; an insulating layer that covers the shield electrode; a touch sensor electrode that is made of a second conductive and opaque material, is located on the insulating layer, overlaps a portion of the display panel in between some of the plurality of sub-pixels, and overlaps the shield electrode; and a feedline is connected to the touch sensor electrode, overlaps a portion of the display panel in between a portion of the plurality of sub-pixels that is not overlapped by the touch sensor electrode, and routes the touch sensor electrode to the touch sensor controller.

20 Claims, 11 Drawing Sheets

TOUCH SENSOR FOR DISPLAY WITH SHIELD

BACKGROUND OF THE INVENTION

1. Field of the Invention

The present invention is directed to a touch sensor for an electronic display system. More specifically, the present invention relates to a self-capacitive touch sensor and a shield electrode provided directly on an electronic display panel and a method of fabricating the same.

2. Description of the Related Art

An electronic display is a device, panel, or screen that visually presents images, text, or video that is transmitted electronically. Examples of electronic displays are used as components in televisions, computer monitors, digital signage, smart phones, and tablet computers. Display devices can either emit light, i.e., emissive type, or modulate light, i.e., non-emissive type.

An organic light emitting-diode (OLED) display device is an emissive type electronic display that includes an organic light emitting display panel and driver electronics to control the organic light emitting display panel. The organic light emitting display panel includes a matrix of sub-pixels with each sub-pixel including an organic light emitting-diode and a driving thin-film transistor (TFT). OLED displays are multi-color with a wide viewing angle, high contrast, and fast response speed.

An OLED display panel includes a pixel layer having colored sub-pixels, typically a combination of red, green, and blue (R, G, B). The pixel layer is typically constructed with two electrodes and an organic light-emitting layer between the two electrodes. The two electrodes include an anode electrode and a cathode electrode, which are applied with different voltages. The pixel layer is usually protected by an encapsulation or sealing layer that may include multiple thin layers or a sealing substrate.

A liquid crystal display (LCD) is a non-emission type display that includes a liquid crystal panel and driver electronics to control the liquid crystal panel. LCD panels include a series of cells that can each be driven independently to modulate input light. An active-matrix liquid-crystal display (AMLCD) includes a matrix of cells or sub-pixels with each sub-pixel including a switching TFT. The TFTs store the electrical state of each sub-pixel on the display while all the other sub-pixels are being updated. The sub-pixels typically include a corresponding red, green, or blue color filter driven in combination to form a color gamut.

A typical LCD includes an array substrate including the TFTs and connecting signal lines, an opposing substrate including the color filter, and a liquid crystal layer in between the two substrates. The driving electronics are used to create a voltage potential between a pixel electrode and a common electrode at each pixel to modulate adjacent liquid crystals in the liquid crystal layer.

The OLED display and LCD are increasingly popular, but other pixelated emissive and non-emissive type electronic display technologies are also well known.

Touch screens are widely used with electronic displays, especially for smart phones and mobile electronic devices. A touch screen is an input device that can be joined with an electronic display device to facilitate user interaction and control. Such devices typically include a touch sensor mounted on a surface of an electronic display that displays interactive information and control electronics to interpret a touch on the touch sensor.

Touch screen devices detect the location of an external touch or gesture of a finger, stylus, or similar object that occurs at or near the surface of the touch sensor. Such touch screens include a matrix of transparent conductive elements or electrodes that form a touch sensor that overlay the display device and separate control electronics to determine the location of the touch object near or in contact with the touch sensor. Touch sensors are typically transparent so the user can view displayed information on the display device through the touch-sensor. By physically touching, or nearly touching, the touch sensor in a location associated with displayed information, a user can select an operation associated with the displayed information. The touch sensor detects the touch and then electronically interacts with the control electronics, or controller, to determine and output the touch location. The output signal of the touch location is input to a processor that associates the touch location or gesture with the displayed information to execute a programmed task associated with the displayed information as a graphic user interface.

Touch screens can use a variety of technologies, including resistive, inductive, capacitive, acoustic, piezoelectric, and optical to locate a touch or gesture on a sensor.

Capacitive touch-screens are of at least two different types: self-capacitive and mutual-capacitive. Self-capacitive touch-screens use an array of transparent electrodes on the sensor in combination with the touching object to form a temporary capacitor, a capacitance of which is detected. Mutual-capacitive touch-screens use an array of transparent electrode pairs that form capacitors, a capacitance of which is affected by the touching object. In both types, each capacitor in the array is sensed to detect a touch, and the physical location of the touch-detecting electrode in the touch-screen corresponds to the location of the touch.

As mentioned, touch sensors are typically transparent or formed to be invisible to the user and minimize optical distractions and artifacts. While interacting with the display panel, the touch sensor should minimize ambient reflection, maximize display transmission, not interfere with display viewing angle, and not cause any Moiré patterns or other optical interference effects. Electrically, the touch sensor should be highly conductive and uniform to maximize sensitivity and minimize voltage potential gradients. Touch sensors are either transparent conductive materials or conductive elements that are spaced apart and are too small to be seen by the user.

A typical transparent touch sensor includes a patterned coating of a conventional transparent conducting material (TCM) such as a transparent conducting oxide (TCO) or indium tin oxide (ITO). Disadvantages of such designs include limited transparency and conductivity and increased sensitivity to mechanical or environmental stress. Thicker layers of conventional TCM increase conductivity and resistance to stress but reduce the transparency of the electrodes.

For increased conductivity and to overcome issues of touch sensors made from conventional TCM, touch sensors can be made from grid patterns of fine metal wires, meshes, or conductive traces. These micro-wires are opaque, but are meant to be fine enough and spaced apart so that they are normally not detectable by the user. Although more uniformly conductive than conventional TCM designs, patterns of micro-wire electrodes can visibly interact with pixels in a display and cause Moiré patterns and other optical interference artifacts.

In order to reduce the device thickness as much as possible, the touch sensor can be formed directly on the display, and the display and touch sensor can be manufactured in the same process. This can result in the reduction of production costs compared with production of the display and touch sensor as separate components and subsequently combining them together. However, because a manufacturing defect in the touch sensor results in the wasted production of the display, features that increase the manufacturing yield of the touch sensor are advantageous.

SUMMARY OF THE INVENTION

To overcome the problems described above, a preferred embodiment of the present invention provides a display device including a display panel including a plurality of sub-pixels; a shield electrode that is made of a first conductive and opaque material, is located directly on the display panel, overlaps a portion of the display panel in between a portion of the plurality of sub-pixels, and is connected to a touch sensor controller; an insulating layer that covers the shield electrode; a touch sensor electrode that is made of a second conductive and opaque material, is located on the insulating layer, overlaps a portion of the display panel in between some of the plurality of sub-pixels, and overlaps the shield electrode; and a feedline that is made of the second conductive and opaque material, is connected to the touch sensor electrode, overlaps a portion of the display panel in between a portion of the plurality of sub-pixels that is not overlapped by the touch sensor electrode, and routes the touch sensor electrode to the touch sensor controller.

The above and other features, elements, characteristics, steps, and advantages of the present invention will become more apparent from the following detailed description of preferred embodiments of the present invention with reference to the attached drawings.

DETAILED DESCRIPTION OF PREFERRED EMBODIMENTS

Preferred embodiments of the present invention provide a self-capacitive touch sensors for use with electronic displays. In a preferred embodiment of the present invention, a shield electrode pattern layer can be provided directly on the encapsulation layer of an OLED pixel layer or a substrate of an LCD closest to the sub-pixels and connected to a touch sensor controller. In addition, in a preferred embodiment of the present invention, a touch sensor pattern layer can be formed or disposed directly on an insulation layer covering the shield electrode pattern and connected to a touch sensor controller to detect an external touch input. For convenience, the touch sensors of various preferred embodiments of the present invention will be described below with respect to an OLED display, but one of ordinary skill in the art will appreciate that the present touch sensors can be used with LCDs or any suitable electronic display technology.

A display panel includes a collection of sub-pixels on a TFT substrate covered with a continuous transparent encapsulation material or substrate. A touch sensor includes a collection of touch electrodes and associated feedlines which connect the touch electrodes to a touch sensor controller. This creates a touch system that detects the position, in up to 3 dimensions, of a touch object relative to the display. The assembly of both the display panel and the touch sensor is referred to as the display device.

As noted above, self-capacitive operation means that the capacitance of an electrode is measured between the touch electrode and a ground, a reference voltage of the touch sensor controller, or another portion of a display. In a mutual-capacitive operation, the capacitance is measured between different touch electrodes. Self-capacitive designs have the advantage of being more sensitive than mutual-capacitive designs.

Rather than combining two separate display panel and touch sensor components, the touch sensors of preferred embodiments of the present invention can be formed or disposed directly on the display panel to significantly reduce or minimize thickness.

A number of challenges and design requirements exist when developing a touch sensor for operation with an electronic display. The touch sensor wiring and an adjacent electrode of the display panel can create a parasitic capacitance. By reducing the distance between a touch electrode or feedline and an electrode on the display panel, electromagnetic forces between the touch electrode or feedline and the electrode on the display panel will generate increased parasitic capacitance. This can be best illustrated by the well-known parallel plate capacitor equation, $C=\varepsilon A/d$ where, d is the distance between the touch electrode or feedline and the display electrode at the reference potential, $\varepsilon$ is the permittivity of the dielectric separating the touch electrode, and A is the area overlapping between the touch electrode or feedline and the display electrode at the reference potential. A touch sensor formed directly on an OLED display is therefore susceptible to high parasitic capacitances. In particular, the OLED cathode electrode may be formed directly below the encapsulation layer and only separated from the touch electrodes and feedlines by, for example, 10 μm.

It is advantageous to significantly reduce or minimize parasitic capacitance that is created between the touch sensor electrode and a closest electrode of the OLED pixel. First, the touch electrode and the feedline that connects the touch electrode to the touch controller form a series resistor-capacitor (RC) circuit where the voltage across the capacitor has an exponential response with a time-constant related to the RC. Therefore, reducing the parasitic capacitance reduces the charge time of the capacitor formed between the touch electrode and feedline and the OLED sub-pixel electrode to allow faster operation. Second, many available touch sensor controllers impose limits on the size of the parasitic capacitance and by reducing the absolute parasitic capacitance, the preferred embodiments of the present invention offer the widest compatibility with available touch sensor controllers.

To allow for a wide range of user input and compatibility with modern software systems, touch sensors require the ability to simultaneously detect multiple user touches. For a self-capacitive design, this can only be achieved by sensing of individual touch electrodes. Individual electrode sensing requires that each electrode is fed by an individual feedline routed past adjacent touch electrodes. In conventional designs, owing to the low conductivity of the feedline material, the feedlines are made wide to keep their resistance low. For larger panels, the wide feedlines necessitate large spacing between touch electrodes. The increase in touch electrode pitch will reduce touch resolution.

Further, wide feedlines can necessitate use of touch electrodes of varying size to ensure sufficient space for passing feedlines and varying sizes of the touch electrodes introduces non-uniformity of parasitic capacitance and sensitivity between touch electrodes causing poor sensitivity and inconsistent touch response across the touch sensor. To reduce the difference in capacitance values or dynamic range among the touch electrodes, maintain sensitivity across the touch sensor, and minimize the complexity and cost of the touch sensor controller, it is desirable that the capacitance, the RC constant, the size of touch electrodes, and the spacing between them be controlled and uniform across the touch sensor.

It is noted that a portion of the parasitic capacitance is attributed to the touch electrode and another portion of the parasitic capacitance is attributed to its associated feedline. False detection occurs when the touch sensor incorrectly reports the detection of the touch object due to the touch object's effect on the capacitance of a feedline. That is, a change in capacitance of a feedline caused by a touch object can be wrongly interpreted as a touch to be detected at the electrode that the feedline is connected to. Therefore, for the same reasons as outlined above, it is advantageous to reduce the parasitic capacitance and the sensitivity, i.e., maximum change in capacitance on the introduction of the touch object to the feedlines.

As mentioned above, a small RC constant is desired. Therefore, it is beneficial to increase the material conductivity to reduce the resistance of the feedlines and touch electrodes. In addition to making the design more tolerant to high capacitances, higher conductivity/lower resistance materials allow for longer feedlines, larger touch sensor designs, and reduced power consumption.

With respect to optical performance of the display panel combined with the touch sensor, any light emitted by or through the display panel but blocked by the touch sensor will require more power to match the light output of a display panel without touch capability. This must be considered across the full range of viewing angles. For instance, in the case of a touch sensor including touch electrodes or feedlines of opaque material according to a preferred embodiment of the present invention, increases in the thickness of the opaque material, reduction in the horizontal proximity between the opaque material and sub-pixels, and an increase in the vertically proximity between the opaque material and sub-pixels of the display panel may cause blocking of emitted light propagating in a direction that would otherwise be emitted, as shown for the light labelled BL in FIG. 1A. Light propagating in a direction that would otherwise be emitted is any light emitted from the sub-pixel which propagates in a direction which would be transmitted into air (i.e. would not be subject to total internal reflection at the interface between the display device and air). This describes the maximum escape angle, measured relative to the normal of the front surface of the display device, of light for the medium the light is propagating within, which is arcsin(1/n), where n is the refractive index of the medium the light is propagating in, for example, the encapsulation layer ENCAP. Also, any non-uniformity in the appearance, caused by both the emitted light and the reflected ambient light, of the display panel with touch sensor detracts from its optical quality.

Preferred embodiments of the present invention solve the above described problems as described in detail below.

Figure 1A:
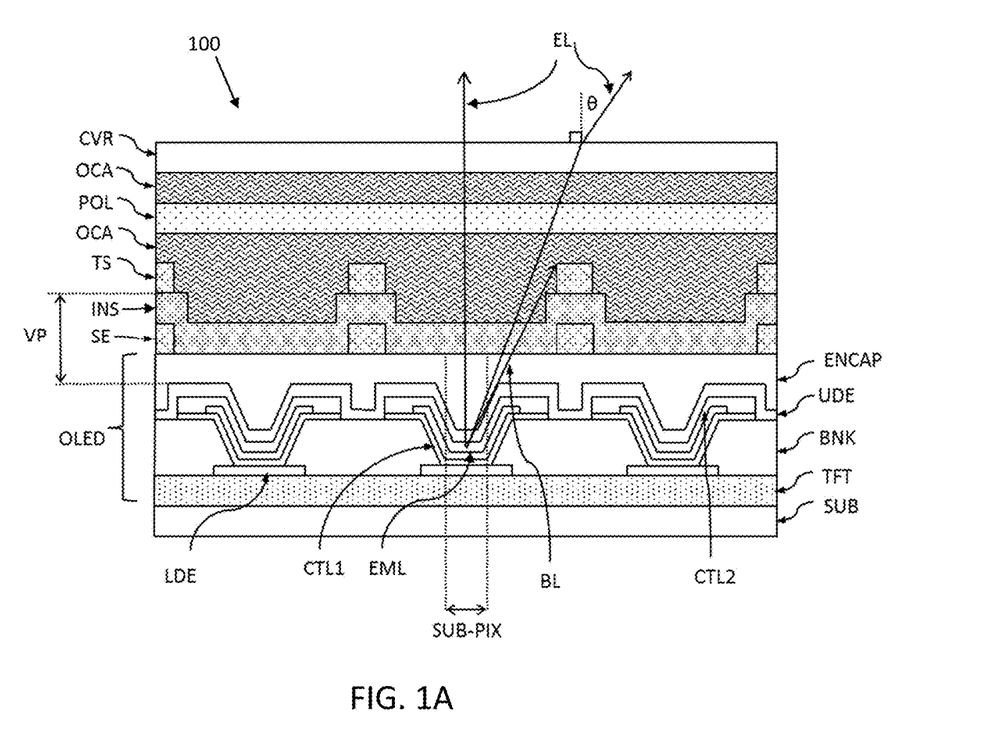
FIG. 1A is a side view of an OLED display panel and touch sensor according to a preferred embodiment of the present invention.
Figure 1B:
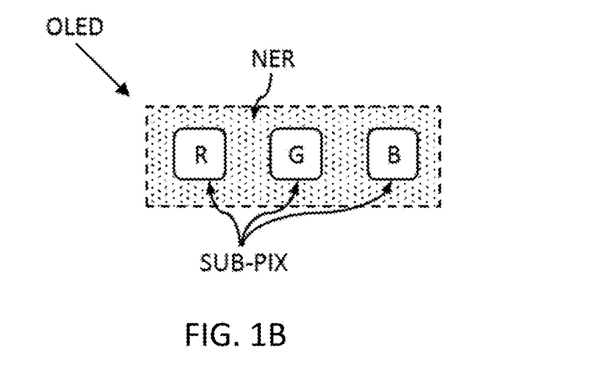
FIG. 1B is a plan view of the OLED display panel showing three OLED sub-pixels from FIG. 1A.

FIG. 1A is a side view of a display device 100 including an OLED display panel OLED and touch sensor TS of a preferred embodiment of the present invention. As shown in FIG. 1A, the display device 100 includes a substrate SUB, a TFT layer TFT on the substrate SUB, a lower display electrode LDE and a bank BNK on the TFT layer TFT, an OLED sub-pixel SUB-PIX on the lower display electrode LDE, an upper display electrode UDE on the OLED sub-pixel SUB-PIX, and an encapsulation layer ENCAP covering the OLED sub-pixel define the OLED display panel OLED. FIG. 1A shows three OLED sub-pixels SUB-PIX. FIG. 1B is a plan view of the OLED display panel OLED showing three OLED sub-pixels SUB-PIX. Light is emitted from the OLED sub-pixels SUB-PIX, and regions in between the OLED sub-pixels SUB-PIX are non-emissive regions NER. In FIG. 1A, the lower and the upper display electrodes LDE, UDE can include a single cathode or anode electrode or a plurality of cathode or anode electrodes. As shown in FIG. 1A, the OLED sub-pixel SUB-PIX includes charge transport layers CTL1, CTL2 and a light emitting layer EML. A conductive and opaque material is provided on the encapsulation layer ENCAP and is patterned to define a shield electrode SE. An insulating layer INS is provided on the shield electrode SE. Preferably, the insulating layer INS can be, for example, one of silicon nitride, silicon oxide, polyimide, and acrylic, or any other suitable material. The touch electrodes and feedlines of the touch sensor TS are made of an electrically conductive and opaque material on the insulating layer INS, as shown in FIG. 1A. Optionally, dummy and/or enhancement electrodes can also be defined in the same electrically conductive and opaque material layer as the touch electrodes and feedlines. Dummy electrodes are electrodes which are not connected to a voltage source such that they are electrically floating. Enhancement electrodes are electrodes which are connected to a voltage source, for example from the touch sensor controller. Dummy electrodes and enhancement electrodes may be disposed in between two touch electrodes, in between two feedlines, and in between a touch electrode and a feedline. Dummy electrodes and enhancement electrodes can be used to increase the sensitivity (change in capacitance) of touch electrodes in response to a touch and improve the visual appearance of a display by providing similar average coverage of conductive and opaque material of the touch sensor in different regions of the display device. Optionally, a polarizer POL and/or cover material CVR can be laminated on the touch sensor TS with optically clear adhesive OCA.

As illustrated in FIG. 1A, the insulating layer INS provides separation and electrical isolation between the shield electrode SE and the touch sensor TS. Both the shield electrode SE and the touch sensor TS are preferably patterned between the OLED sub-pixels such that they do not overlap with the sub-pixels. Therefore, there is no reduction in emitted light EL at and close to the normal viewing angle. Also, as compared with a conventional transparent touch sensor that is continuous over the display panel, the parasitic capacitance between the touch sensor TS and upper display electrode UDE is reduced due to the reduced area of the touch electrodes and feedlines. The shield electrode SE is provided to reduce the parasitic capacitance between the touch sensor TS and the upper display electrode UDE by blocking the electric field between the touch electrodes and the upper display electrode UDE. Preferably, the insulating layer INS between the touch sensor TS and shield electrode SE is very thin (e.g., less than about 10 μm, preferably less than about 1 μm, and most preferably about 100 nm), in order to maximize the effectiveness of the shield electrode by reducing the parasitic capacitance. A thin insulating layer INS also reduces the vertical proximity between the conductive and opaque materials of the touch sensor TS and emissive regions of the sub-pixels, thereby reducing the extent of, or eliminating, blocking by the touch sensor TS of light emitted by the sub-pixels which propagates in a direction which would otherwise be emitted from the display device (i.e. reducing the extent of, or eliminating, blocked light BL).

Figure 2:
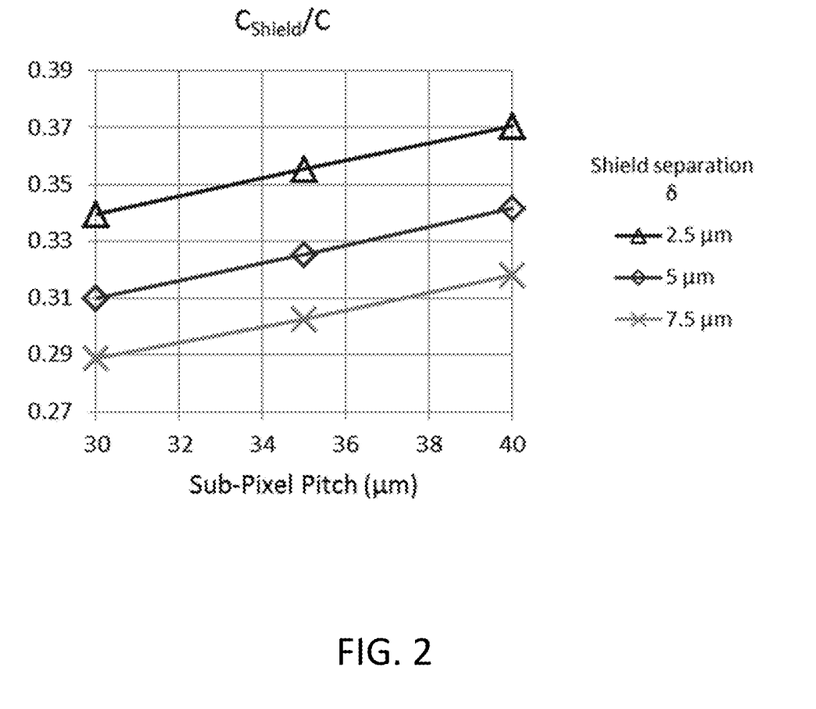
FIG. 2 is a graph of parasitic capacitance with different separations between a touch electrode and an upper display electrode of an adjacent OLED sub-pixel.

The calculated effects of a shield electrode on parasitic capacitance is shown in the graph of FIG. 2. This graph shows the result of a 3-dimensional finite element numerical analysis of the parasitic capacitance, with and without a shield electrode, between a touch electrode and upper display electrode of an OLED sub-pixel where the shield electrode and touch electrode or the touch electrode alone is deposited directly on the encapsulation layer of the OLED display. The graph in FIG. 2 plots the ratio of the parasitic capacitance of a touch electrode with the shield present $C_{Shield}$ to parasitic capacitance of the touch electrode without the shield present C as the vertical axis with respect to the sub-pixel pitch of the display panel along the horizontal axis with three different distances of separation (δ) between the touch electrode and shield electrode. The touch electrode is patterned with a regular square grid structure having a pitch equal to the sub-pixel pitch and with wire sections 5 μm wide. The shield electrode is patterned to be aligned with and to have an identical shape as the touch electrode. The upper display electrode of the OLED is a continuous conducting layer. For the structure with a shield layer, the distance between the upper display electrode and the shield electrode is 10 μm. For the structure without a shield electrode, the distance between the upper display electrode and the touch electrode is 10 μm. The shield electrode is electrically isolated from the touch electrode but is driven at the same potential as the touch electrode. The results show that the parasitic capacitance is significantly reduced by the shield electrode. Advantageously, the shield electrode significantly reduces the parasitic capacitance even though the shield electrode does not overlap with the sub-pixels.

The touch electrodes and feedlines may preferably be defined in a single layer of conductive and opaque material. This allows for low cost manufacturing. The conductive and opaque material can be, for example, one of titanium, aluminum, copper, silver, gold, molybdenum, zinc, tungsten, nickel, tin, platinum, graphene, or any alloy thereof, but is not limited thereto. Optionally, the conductive and opaque material can be a stack of multiple layers, for example, a sequence of Ti/Al/Ti layers or combination of the other materials mentioned, but is not limited thereto. The same conductive and opaque material(s) is preferably deposited and patterned to define all of the touch electrodes and feedlines in a shared process, but different materials, deposition process and patterning process may be used for the touch electrodes and feedlines. The conductive and opaque material of the shield electrode can be, for example, one of titanium, aluminum, copper, silver, gold, molybdenum, zinc, tungsten, nickel, tin, platinum, graphene, or any alloy thereof, but is not limited thereto. Optionally, the conductive and opaque material of the shield electrode can be a stack of multiple layers, for example, a sequence of Ti/Al/Ti layers or combination of the other materials mentioned, but is not limited thereto. Preferably the material of the shield electrode and the material of the touch sensor have similar optical reflectivities, thereby providing similar visual appearance with respect to reflection of ambient light under some embodiments of the present invention. The conductive and opaque material may be deposited by evaporative coating in a vacuum and patterned using a standard photoresist and etch process, for example, with a wet chemical etch or a reactive gas etch. An insulating layer INS of silicon oxide or silicon nitride may be deposited by plasma enhanced chemical vapor deposition; and an insulating layer INS of acrylic or polyimide may be deposited from a chemical precursor solution. Furthermore, because the shield electrode SE and touch sensor TS are each preferably defined in single layers of the conductive and opaque material, all of the conductive and opaque material is located close to the plane of the light emission from the OLED. This reduces the extent of, or eliminates, blocking of light from the OLED sub-pixels SUB-PIX which propagates in a direction which would otherwise propagate at a high polar viewing angle (a polar viewing angle θ is shown in FIG. 1A). An example of a direction of blocked light BL is shown in FIG. 1A. This configuration is preferable to a configuration using conventional TCMs in thick layers because these materials are only partially transparent and cannot be used in thick layers without causing high absorption or reflection of light from the OLED sub-pixels SUB-PIX.

Preferably the conductive and opaque material has a conductivity significantly higher than that provided by conventional TCMs. Therefore, the parasitic capacitance of the touch electrodes and feedlines can be lowered without increasing resistance. Thus, the conductive and opaque material of touch sensors of preferred embodiments of the present invention can be very thin and narrow with low resistance.

Also, the conductivity of the conductive and opaque material of preferred embodiments of the present invention is high enough that a feedline may have a width small enough to be entirely between adjacent sub-pixels, while not overlapping with these sub-pixels. Thus, the problems associated with wide feedlines discussed above is avoided. Furthermore, increased conductivity of feedlines allows for larger designs (i.e., touch sensors on display panels with larger areas such that the feedlines connecting electrodes to a touch panel controller are long) without their resistance becoming problematically high.

Figure 3:
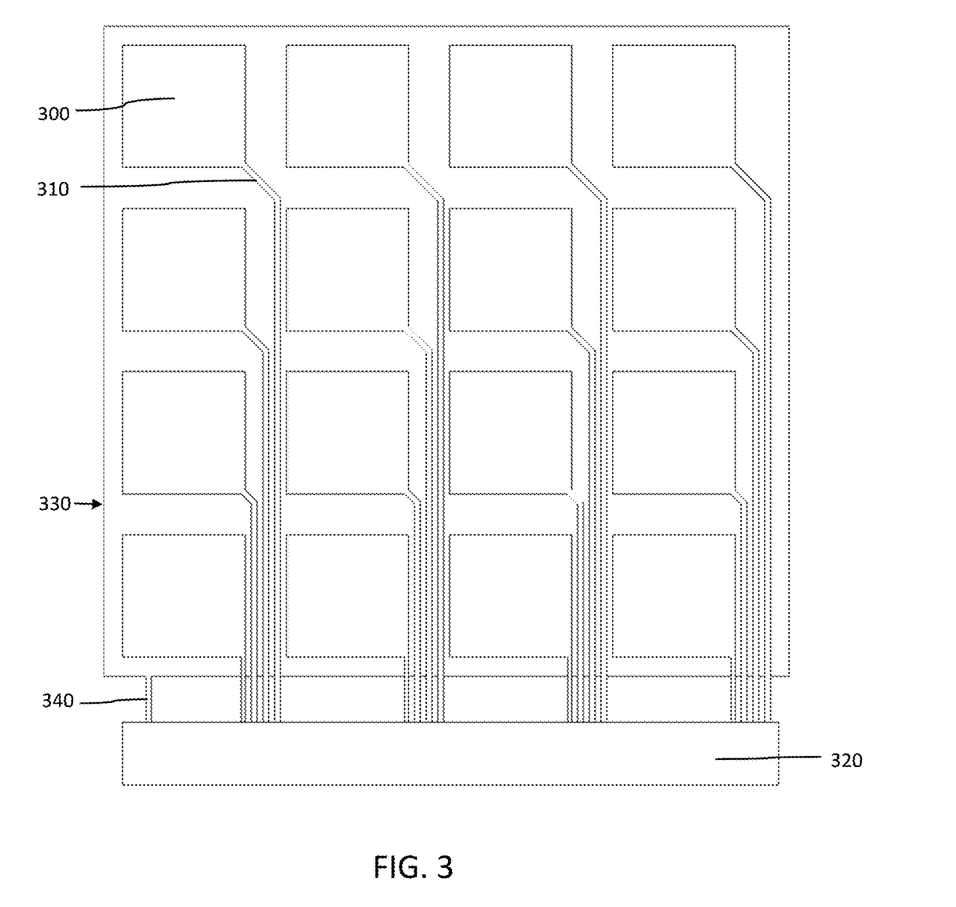
FIG. 3 is a plan view of a touch panel configuration according to a preferred embodiment of the present invention.

FIG. 3 shows an exemplary grid layout of the touch electrodes 300 with an individually connected feedline 310 according to a preferred embodiment of the present invention. The outlines of the touch electrode 300 and the connected feedline 310 in FIG. 3 indicate the outer extents of the touch electrodes 300 and feedlines 310; the structure whereby the touch electrodes 300 and feedlines 310 are not overlapping with the sub-pixels is not shown. At the sub-pixel scale, the edges of the touch electrodes 300 and feedlines 310 may not be straight lines, as in FIG. 3. In this configuration, not all of the sub-pixels of the display panel are enclosed within a touch electrode 300. As shown in FIG. 3, the feedlines 310 are routed to a touch sensor controller 320 that is at an edge of or off the display panel. The touch sensor controller 320 can be directly bonded to a substrate of the display panel or connected to the feedlines 310 using another connection method. FIG. 3 also shows a shield electrode 330 connected to the touch sensor controller 320 via a shield feedline 340. The outline of the shield electrode 330 indicates the outer extent of the shield electrode 300; the structure whereby the shield electrode is not overlapping with the sub-pixels is not shown. At the sub-pixel scale, the edges of the shield electrode 330 may not be straight lines, as in FIG. 3. Overall, FIG. 3 shows a self-capacitive touch sensor and a shield layer of a display panel each made from a conductive and opaque material that has higher conductivity than conventional TCM devices, wherein the conductive and opaque materials of the touch sensor and shield layer do not overlap the sub-pixels.

Figure 4:
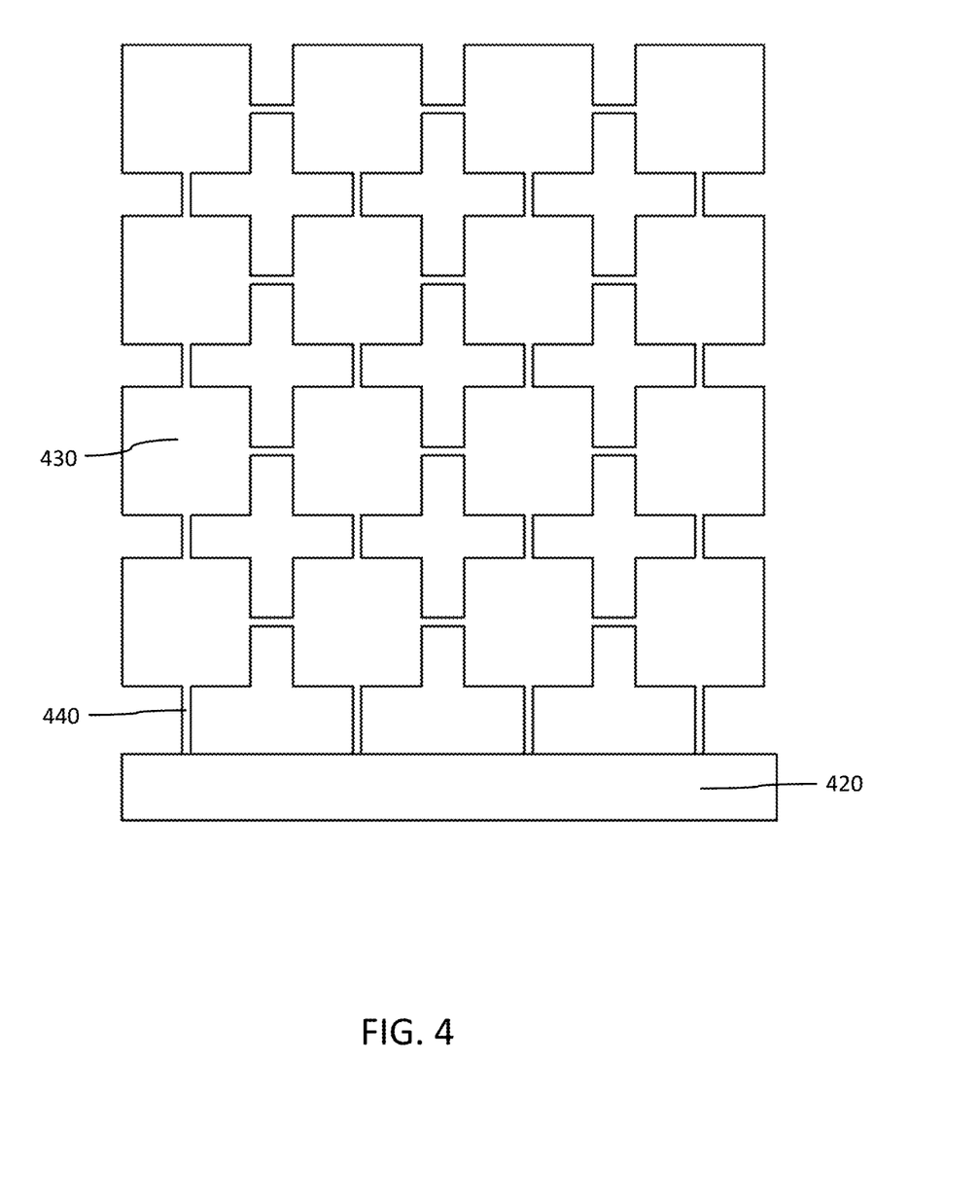
FIG. 4 is a plan view of a shield electrode structure according to a preferred embodiment of the present invention.

An alternative shield electrode structure can be seen in FIG. 4, in which first regions of the shield electrode 430 (i.e., the square regions) align with the positions of the touch electrodes 300 in the touch sensor layer. Preferably the size and/or shape of the first regions of the shield electrode 430 are similar or identical to those of the touch electrodes 300 they are aligned with. FIG. 4 shows that multiple first regions of the shield electrode 430 are each connected together and are routed with multiple shield feedlines 440 to the touch sensor controller 420.

Preferred embodiments of the present invention preferably include the grid layout patterns of the touch electrodes 300 and feedlines 310 and the shield electrode 330 and 430 and shield feedlines 340 and 440 as shown in FIGS. 3 and 4. However, such an arrangement is not mandatory. Preferred embodiments of the present invention may also include different sub-pixel layouts, such as the first and second sub-pixel distributions, as shown in FIGS. 5 and 6, for example.

Figure 5:
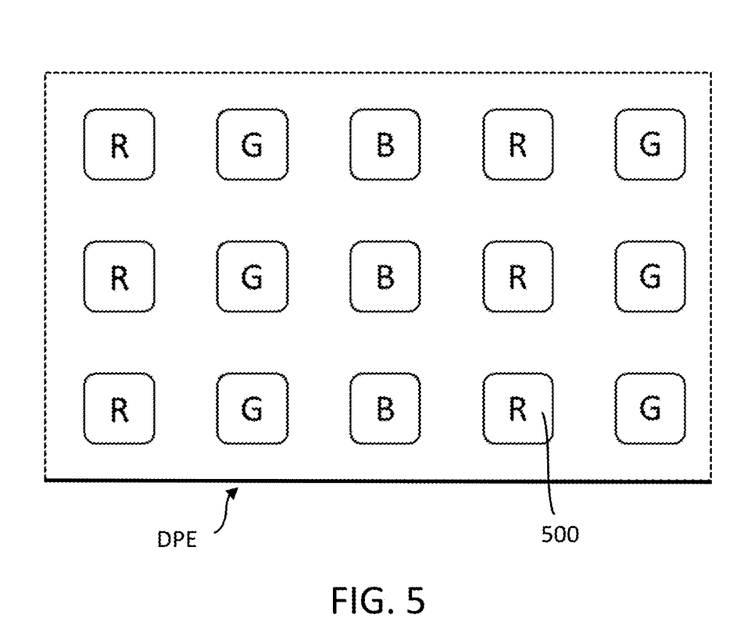
FIG. 5 shows a representative portion of an OLED display panel with a first sub-pixel distribution layout according to a preferred embodiment of the present invention.

FIG. 5 shows a representative portion of the OLED display panel with the first sub-pixel distribution layout where edges of the sub-pixels (R, G, B) 500 are aligned parallel or substantially parallel with a rectangular display panel edge DPE.

Figure 6:
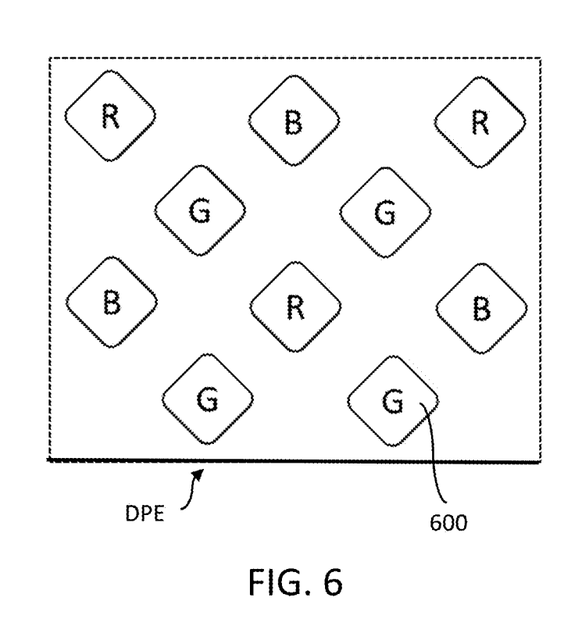
FIG. 6 shows a representative portion of an OLED display panel with a second sub-pixel distribution layout according to a preferred embodiment of the present invention.

FIG. 6 shows a representative portion of the OLED display panel with the second sub-pixel distribution layout where edges of the sub-pixels (R, G, B) 600 are aligned at 45° with the rectangular display panel edge DPE.

In all sub-pixel distributions, the sub-pixels can be of different sizes and shapes or of equal size (e.g., red sub-pixels may be different size and shape compared with green subpixels). The sub-pixels can be grouped into one or more groups of equal size and/or the same color. For example, the sub-pixel shape may be square, rectangular, rounded, have rounded corners, curved edges, or 5 or more straight edges. One sub-pixel may include more than one separate emissive region, each of which emits substantially the same color of light, for example.

The operation of the touch sensor involves the repeated measurement, simultaneously or in-turn, of the capacitance, with respect to a touch sensor controller reference voltage or ground, of each touch electrode. Optionally, the operation of the touch sensor involves the repeated measurement, simultaneously or in turn, of the capacitance, with respect to an electrode of the OLED (preferably the upper display electrode UDE), of each touch electrode. There are various techniques to measure capacitance, including but not limited to, Charge transfer, Delta-sigma modulation, Relaxation oscillator, and Charge time measurement. All techniques will involve the application of one or many voltage (the drive voltage) pulses to the touch electrodes such that an electric field is projected from the touch electrodes.

Additionally, a same voltage potential can preferably be applied to the shield electrode 330 and 430 that is applied to the touch electrodes 300. The voltage potential can be applied as a series of pulses synchronized with the touch electrode drive signal or as a fixed voltage. Because the shield electrode 330 and 430 is at the same potential as the touch electrodes 300, no electric field and, therefore, no parasitic capacitance is generated between the shield electrode 330 and 430 and the touch electrodes 300. However, a parasitic capacitance will exist between the shield electrode 330 and 430 and the upper display electrode UDE. Therefore, the shield electrode 330 and 430 is electrically isolated from the touch electrodes 300 so that this parasitic capacitance does not affect sensing of a touch by the touch sensor. That is, although the shield electrode 330 and 430 and the touch electrodes 300 are driven at the same potential, they are isolated from one another such that there is no electrical connection between the shield electrode 330 and 430 and the touch electrodes 300.

As discussed above, when a touch object comes within close proximity to the touch electrode, the interaction of the projected electric field from the touch electrode and the touch object causes a change in charge held on the touch electrode and, therefore, a change in its capacitance. Therefore, by detecting a change in capacitance, the presence of a touching object can be determined. Because the touch electrodes are patterned in a touch sensor array on the display panel, depending on which touch electrode indicates a change in capacitance, the location of the touch on the touch sensor and display panel can be determined.

Figure 7A:
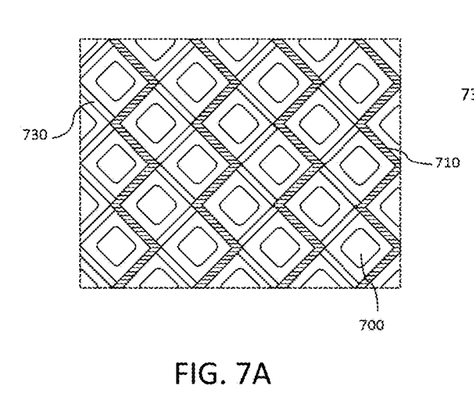
FIG. 7A shows a configuration of feedlines according to a preferred embodiment of the present invention.
Figure 7B:
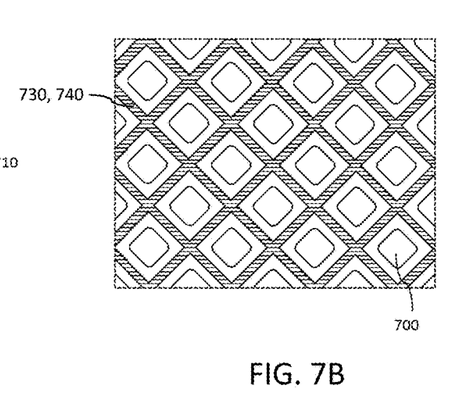
FIG. 7B shows a configuration of a touch electrode according to a preferred embodiment of the present invention.

FIGS. 7A and 7B show a preferred embodiment of the present invention. FIG. 7A shows a representation of touch sensor feedlines 710 (shaded areas) and a shield electrode 730 with respect to the second pixel distribution layout. FIG. 7A shows a feedline region of the touch sensor, showing four feedlines 710 routing vertically in the figure. FIG. 7B shows a representation of a portion of a touch electrode 740 and a shield electrode 730 in a touch electrode region of the touch sensor. In the touch electrode region, the conductive and opaque material of the shield electrode 730 preferably has the same pattern as the conductive and opaque material in the touch electrode 740, so the shield electrode 730 is not distinguishable from the touch electrode 740 in the plan view of FIG. 7B. In the feedline region of FIG. 7A, the conductive and opaque material of the shield electrode 730 has the same pattern as the conductive and opaque material in the touch electrode and thus the shield electrode 730 is not distinguishable under the feedlines 710 in FIG. 7A.

The average coverage of conductive and opaque material in the touch sensor layer in the feedline region is lower than the average coverage in the touch electrode region, owing to the gaps which enable electrical isolation of adjacent feedlines. The region over which the average coverage is determined is at least an area of the display panel that includes a 2×2 array of sub-pixels. Preferably, the feedlines 710 are patterned as shown in FIG. 7A such that the total area of the feedlines 710 routed around the sub-pixels 700 is reduced or minimized while maintaining a low resistance electrical connection along its length. Reducing or minimizing the area of the feedline 710 reduces the parasitic capacitance and also the sensitivity to touch in the feedline 710 which reduces the false detection problem. Preferably, in touch electrode regions, the conductive and opaque material is in between every sub-pixel included in the touch electrode 740 as illustrated in FIG. 7B.

In the feedline region like that of FIG. 7A, the shield electrode 730 preferably has a similar pattern and average coverage of conductive and opaque material as in the touch electrode region. FIG. 7A shows that the shield electrode 730 is present underneath the feedline 710 and continues where the feedline 710 is not present. Therefore, the average coverage of the conductive and opaque material in either touch electrode 740 or shield electrode 730 layer in a plan view projection is similar in both the touch electrode region and feedline region. This provides uniform reflection of ambient light and light output from the sub-pixels across the display panel. This ensures that no undesirable patterns are clearly visible between touch electrode and feedline regions and that all areas of the display panel have similar viewing characteristics. Preferably, the average coverage of conductive and opaque material in either the touch sensor or shield electrode layer in a plan view projection in feedline regions is between about 50% and about 150% of the coverage in touch electrode regions, and more preferably between about 80% and about 120%, to provide acceptably low visibility of differences between the two regions.

In a feedline region, the gap between adjacent feedlines 710 and the gap between feedlines 710 and adjacent touch electrodes (not shown) may be as wide as up to the pitch between adjacent sub-pixels, as shown in FIG. 7A, while maintaining the maximum density of feedlines 710, where the pitch is the distance between the center of a sub-pixel 700 and the center of an adjacent sub-pixel 700. As a result of this large gap, the probability of short circuiting from manufacturing defects in patterning extra conductive material is reduced. This preferred embodiment of the present invention can be applied to both the first pixel distribution (e.g., FIG. 5) and second pixel distribution (e.g., FIG. 6) layouts.

Figure 8:
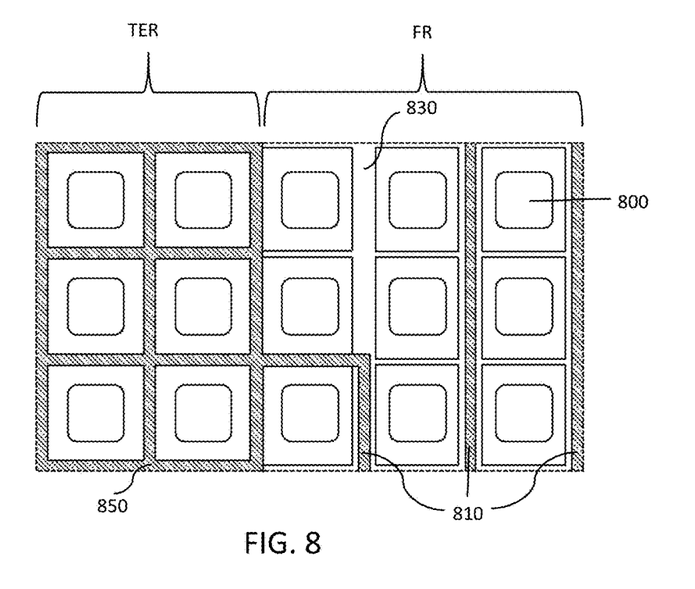
FIG. 8 shows a configuration of a touch electrode, feedlines, and a shield electrode according to a preferred embodiment of the present invention.

FIG. 8 shows a preferred embodiment of the present invention that includes a representation of a touch electrode 850, feedlines 810, and a shield electrode 830 with respect to the first pixel distribution layout. FIG. 8 shows a touch electrode region TER and a feedline region FR. The coverage of conductive and opaque material in the touch sensor layer is similar to that discussed above with respect to FIGS. 7A and 7B for a feedline region and a touch electrode region. In this preferred embodiment, in the touch electrode region TER, the shield electrode is the same width as the touch electrode 850, thus is not seen. However, in the feedline region FR, the shield electrode 830 is wider than the feedlines 810. FIG. 8 shows that the shield electrode 830 overlaps with the feedlines 810 and extends out to be wider than the feedlines 810 without overlapping the sub-pixels 800. The increased width of the shield electrode 830 further reduces the feedline parasitic capacitance, and also reduces sensitivity to touch associated with the feedline (i.e., it has the effect of reducing or eliminating occurrences of a false touch detection). The increased width of the shield electrode 830 reduces the parasitic capacitance by shielding the fringing electric fields at the edges of the feedlines 810 and also reduces the strength of the projected electric field and the feedline sensitivity.

Figure 9:
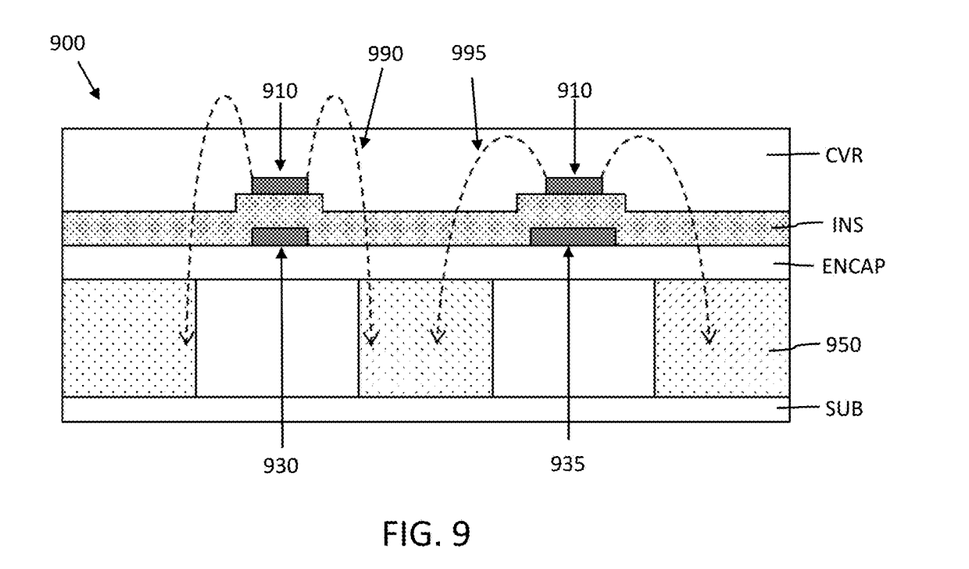
FIG. 9 is a representative side view of an OLED display panel including a shield electrode with the same width as the feedline and a shield electrode wider than the feedline in accordance with a preferred embodiment of the present invention.

FIG. 9 shows a representative side view of a display device 900 comparing a shield electrode 930 having the same width as the feedline 910 on the left side of the figure and a shield electrode 935 wider than the feedline 910 on the right side of the figure. Remaining portions of the display device 900 are preferably similar to those discussed with respect to FIG. 1 and are not described again for the sake of brevity. FIG. 9 represents that the fringing electric field 995 on the right side of the figure with the shield electrode 935 wider than the feedline 910 in between sub-pixel regions 950 is reduced as compared to the fringing electric field 990 on the left side of the figure.

In another preferred example for a feedline region, when the shield electrode is wider than the feedline, the distribution of conductive and opaque material in the shield layer may be adjusted to provide an average coverage of conductive and opaque material in either the touch sensor or the shield electrode layer in a plan view projection which is similar to the average coverage in a touch electrode region. With respect to FIG. 8, for example, the conductive and opaque material of the shield electrode 830 in between adjacent feedlines 810 is preferably configured so that the average coverage of conductive and opaque material across the display panel is uniform. Advantageously, the average area coverage of conductive and opaque material in the touch electrode regions is similar to or the same as the average area coverage of conductive and opaque material in the feedline regions, even though there is additional shielding of the feedlines 810. This preferred embodiment of the present invention can be applied to both the first pixel distribution (e.g., FIG. 5) and second pixel distribution (e.g., FIG. 6) layouts.

Figure 10A:
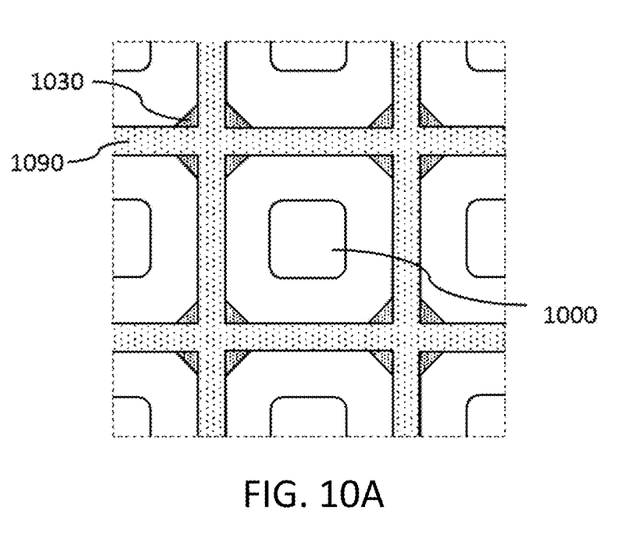
FIGS. 10A-10C show a preferred embodiment of the present invention where the shield electrode area is increased in regions where the touch electrode includes an internal corner.

FIG. 10A shows a preferred embodiment of the present invention where an area of the shield electrode 1030 is increased in regions where the touch electrode or feedline has an internal corner or internal curved edge (hereafter referred to as a "corner"). FIG. 10A shows the touch electrode 1090 and shield electrode 1030 in a touch electrode region, but similarly this feature may be applied to a feedline region. The purpose of this preferred embodiment is to decrease the variation in electrical properties (e.g., parasitic capacitance of a touch electrode or feedline) from display device to display device caused by the random error in alignment between the shield electrode 1030 and the touch electrode or feedline during fabrication. Because the shield electrode 1030 reduces the electric field between the touch electrode or feedline and an upper display electrode UDE, the effectiveness of the shield electrode 1030 in reducing parasitic capacitance is determined by the area where the touch electrode or feedline overlap the shield electrode. By increasing the area of the shield electrode 1030 where the touch electrodes or feedlines have internal corners, the change in the area of the touch electrode or feedline overlapped by the shield electrode 1030 that is caused by misalignment between the two layers is reduced.

Figure 10B:
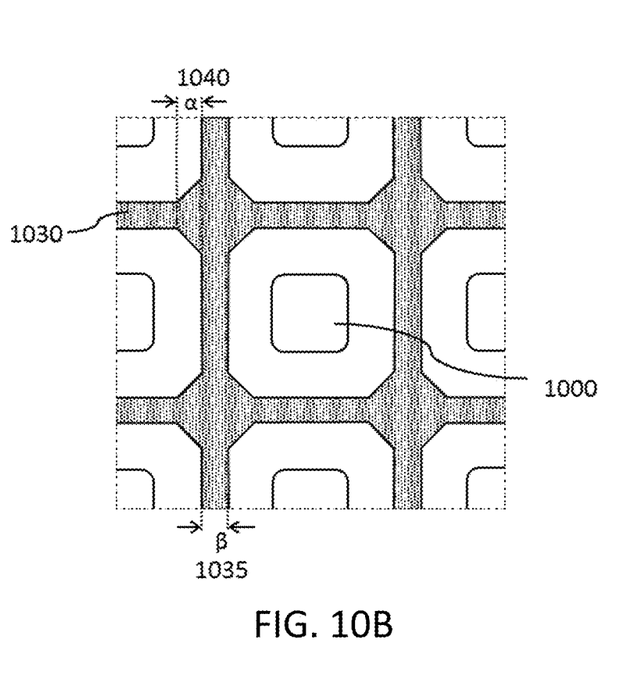
Figure 10C:
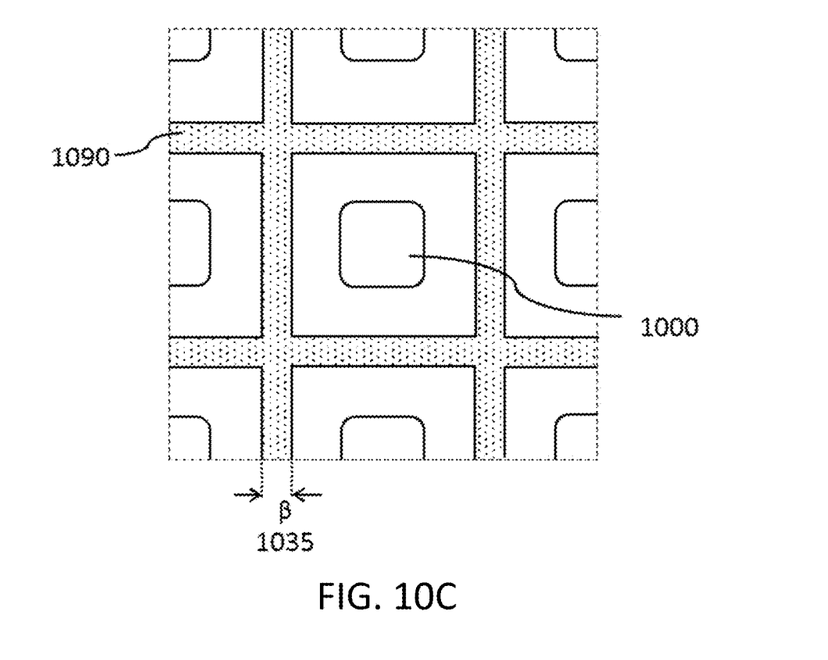

FIG. 10A shows a representative portion of an OLED display in which the conductive and opaque material of a touch electrode 1090 and the shield electrode 1030 surround sub-pixels 1000. For clarity, FIG. 10B shows only the shield electrode 1030 and the sub-pixels 1000, and FIG. 10C shows only the touch electrode 1090 and the sub-pixels 1000. The width β 1035 of a line forming a portion of the touch electrode 1090 and the underlying shield electrode 1030 is shown in FIG. 10B and FIG. 10C. A width α of a leg 1040 of a triangle representing an increase of the conductive and opaque material of the shield electrode 1030 near the internal corners of the touch electrode 1090 is shown in FIG. 10B. Accordingly, with the preferred embodiment of the present invention shown in FIG. 10A, there is no misalignment between the shield electrode 1030 and the touch electrode 1090.

Figure 11:
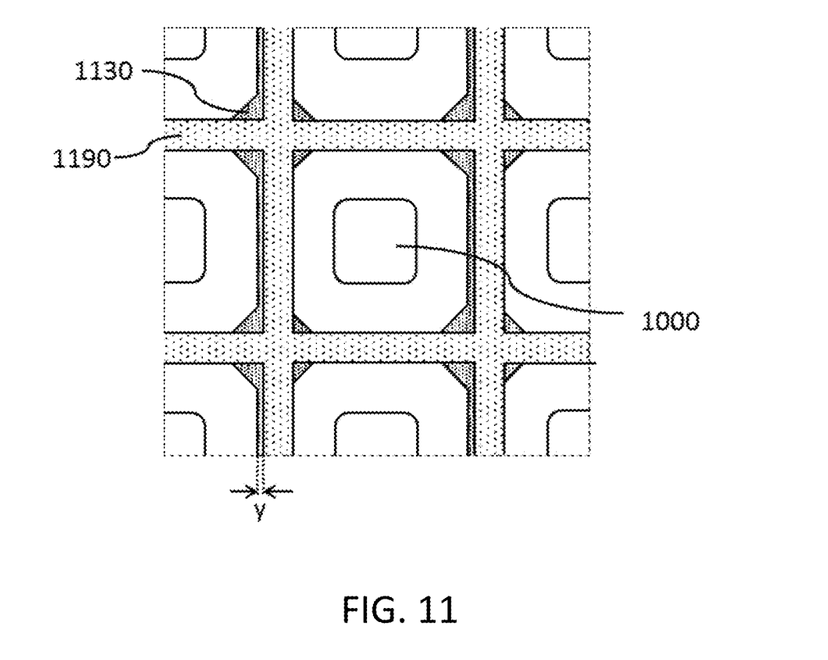
FIG. 11 shows a representative portion of touch electrode and a shield electrode similar to that in the views of FIGS. 10A-10C with a misalignment.

FIG. 11 shows a representative portion of an OLED display in which a shield electrode 1130 and the touch electrode 1190 are provided. However, FIG. 11 shows an alignment error y between the shield electrode 1130 and the touch electrode 1190.

Figure 12:
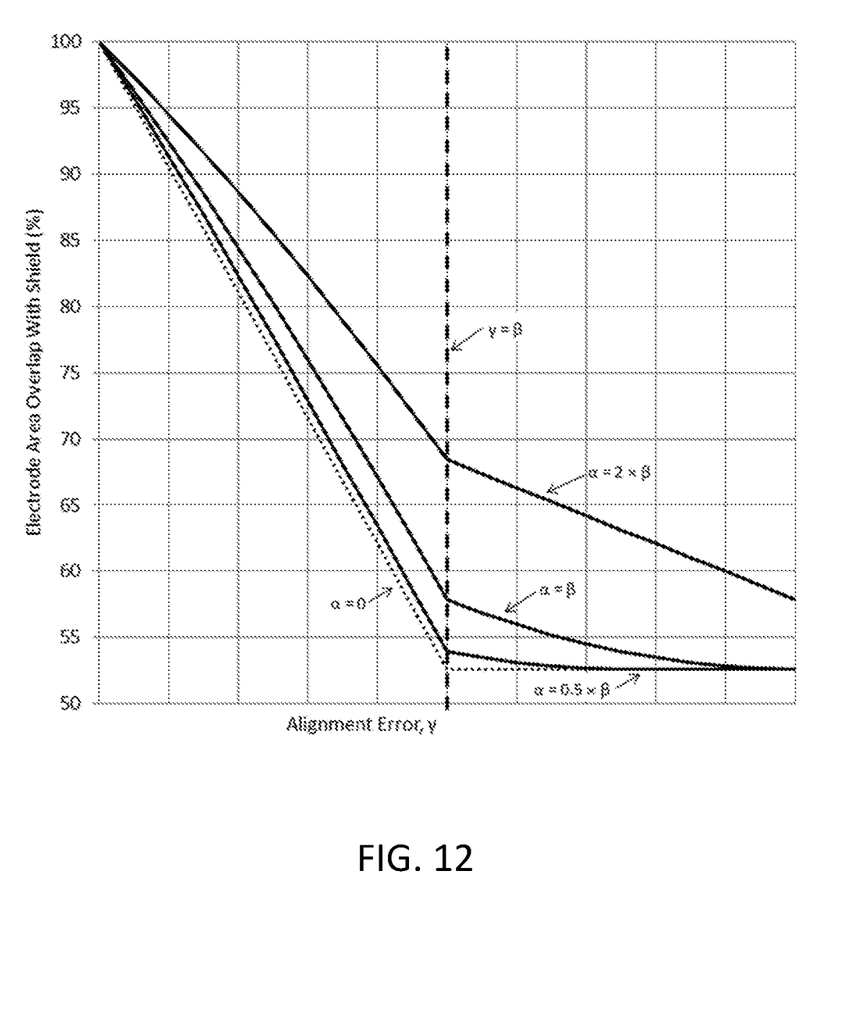
FIG. 12 shows a calculated model of the percentage of touch electrode area overlapped by the shield electrode against a relative percentage of only horizontal alignment error for a configuration of preferred embodiments of the present invention where the width of the touch electrode is the same as the width of the shield electrode in between subpixels.

Using the parameters described above, FIG. 12 shows a calculated model of percentages of a touch electrode area overlapped by the shield electrode plotted against a relative percentage of only horizontal alignment error for a configuration where the width of the touch electrode is the same as the width of the shield electrode in between subpixels. The vertical dashed line in FIG. 12 represents a location where the alignment error y equals the width β of the touch electrode and the shield electrode lines. Several examples of preferred embodiments of the present invention are plotted with varying relationships of the length α of the leg 1040 of the corner regions to the width β of the touch electrode and the shield electrode lines. The plotted dotted line represents a case where there is no increase in area of the shield electrode near the internal corners of the touch electrode and the solid lines represent cases where an increased area of the shield electrode is provided.

From FIG. 12, it can be seen that increases in the shield electrode area in internal angle corners caused by larger values of the length α result in a smaller reduction in overlapped area as the alignment area increases. In FIG. 10, adjacent to an internal corner in the touch electrode or feedline, the shield electrode 1030 extends beyond the touch electrode or feedline with a triangular shape. In another preferred embodiment, adjacent to an internal corner of the touch electrode or feedline, the shield electrode 1330 extends beyond the touch electrode to a curved edge which is concave with respect to the adjacent sub-pixel 1300, as shown in FIG. 13.

By increasing the shield electrode area in the internal angle corners only, the optical performance of the display panel at high viewing angles is still maintained. In particular, this shield electrode structure reduces variation in parasitic capacitance between devices due to misalignment between the shield and the touch electrodes or feedlines without causing additional blocking of light from the sub-pixel which propagates in a direction which would otherwise be directly emitted from the display device. As is apparent from FIG. 1A, the conductive opaque material of the shield electrode SE, touch electrode or feedline of the touch sensor TS may block light from the sub-pixel SUB-PIX which would otherwise be directly emitted from the display if the horizontal separation between the edge of the sub-pixel SUB-PIX and the opaque material is below a particular value for a given vertical proximity VP between the layers. Preferably for this, and all previous embodiments, the shield electrode, touch electrode, and feedline are between sub-pixels with sufficiently high separation from the edge of the sub-pixel that no light which would otherwise be directly emitted from the display is blocked, and therefore the brightness of the emitted light for high polar viewing angles is not reduced.

Figure 13:
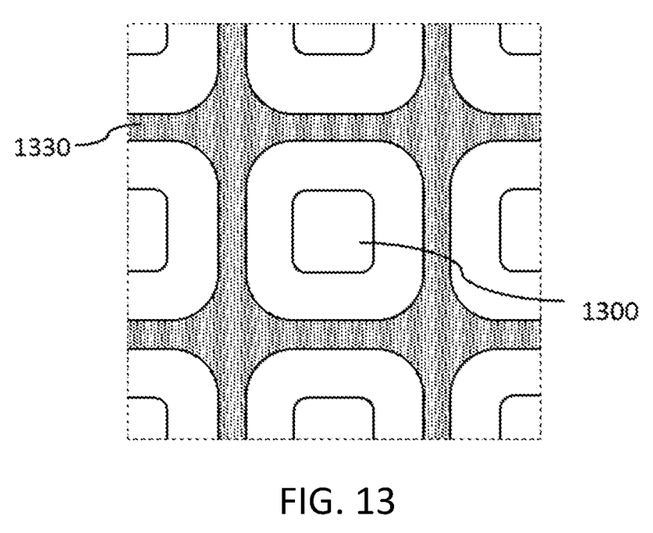
FIG. 13 shows a configuration of a touch electrode, feedlines, and a shield electrode according to a preferred embodiment of the present invention.

Referring again to the shield shapes in FIG. 10 and FIG. 13, since the additional shield area is in the corners furthest from the sub-pixel 1000, 1300, the distance between the edge of the sub-pixel 1000, 1300 and the opaque material of any of the shield electrode, touch electrode and feedline may still remain the same as or larger than the separation discussed above at the center of an edge of a sub-pixel 1000, 1300. Optionally, the sub-pixel can be configured to have rounded corners, can be round, can be defined as a multi-sided polygon, or can be provided in any other desirable shape such that the minimum horizontal proximity of the sub-pixel emissive regions to the shield electrode is not reduced even when the shield electrode area is increased in the internal corners.

Although described here for internal corners, the additional shield material may also be used around external corners of the touch electrodes and feedlines. This is particularly advantageous for feedlines because they may have a higher ratio of number of external corners divided by number of internal corners than touch electrodes.

Preferably for all previous embodiments, the conductive and opaque material of the touch electrodes, feedlines and shield electrode is distributed between sub-pixels with sufficiently high separation from the edge of the sub-pixel, measured in the plane of the display device, that no light which would otherwise be directly emitted from the display device is blocked, and therefore the brightness of the emitted light for high polar viewing angles is not reduced. To achieve this, a suitable minimum separation between the edge of the sub-pixel and the conductive and opaque material provides a direction between the edge of the sub-pixel and the edge of the conductive and opaque material which is at an angle relative to the direction perpendicular to the plane of the display device that is equal to the maximum escape angle for light emitted from the sub-pixel.

It should be understood that the foregoing description is only illustrative of preferred embodiments of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:

1. A display device comprising:
    a display panel including a plurality of sub-pixels;
    a shield electrode that is made of a first conductive and opaque material, is located directly on the display panel, overlaps a portion of the display panel in between a portion of the plurality of sub-pixels, and is connected to a touch sensor controller;
    an insulating layer that covers the shield electrode;
    a touch sensor electrode that is made of a second conductive and opaque material, is located on the insulating layer, overlaps a portion of the display panel in between some of the plurality of sub-pixels, and overlaps the shield electrode; and a feedline that is made of the second conductive and opaque material, is connected to the touch sensor electrode, overlaps a portion of the display panel in between a portion of the plurality of sub-pixels that is not overlapped by the touch sensor electrode, and routes the touch sensor electrode to the touch sensor controller.

2. The display device of claim 1, wherein the shield electrode, the touch sensor electrode, and the feedline overlaps only a non-emission region between the plurality of sub-pixels.

3. The display device of claim 1, wherein the shield electrode is provided with a same voltage or substantially a same voltage as the touch sensor electrode.

4. The display device of claim 1, wherein the shield electrode is electrically isolated from the touch sensor electrode.

5. The display device of claim 1, wherein a width of a portion of the shield electrode that overlaps the feedline is wider than a width of the feedline.

6. The display device of claim 5, wherein
the shield electrode includes a connecting portion connecting the portion of the shield electrode that overlaps the feedline to a portion of the shield electrode that overlaps an adjacent feedline, and
a width of the connecting portion is narrower than the width of the feedline.

7. The display device of claim 1, wherein a pattern of the shield electrode between the feedline and an adjacent feedline is the same or substantially the same as a pattern of the touch sensor electrode.

8. The display device of claim 1, wherein a width of a portion of the shield electrode overlapping the feedline is equal or substantially equal to a width of the feedline.

9. The display device of claim 8, wherein
the shield electrode includes a connecting portion connecting the portion of the shield electrode that overlaps the feedline and a portion of the shield electrode that overlaps an adjacent feedline, and
a width of the connecting portion is equal to or substantially equal to the width of the feedline.

10. The display device of claim 1, wherein the feedline includes a serpentine or zig-zag pattern in between adjacent sub-pixels of the plurality of sub-pixels.

11. The display device of claim 1, wherein the shield electrode is wider than the touch sensor electrode adjacent to a corner of the touch sensor electrode or the feedline.

12. The display device of claim 1, wherein a triangular shaped portion of the shield electrode extends beyond an edge of the touch sensor electrode or the feedline in an area adjacent to a corner of the touch sensor electrode or the feedline in which the shield electrode overlaps.

13. The display device of claim 1, wherein a curved shaped portion of the shield electrode extends beyond an edge of the touch sensor electrode or the feedline in an area adjacent to a corner of the touch sensor electrode or the feedline in which the shield electrode overlaps.

14. The display device of claim 1, wherein a distance between an edge of the touch sensor electrode and a nearest edge of one of the plurality of the sub-pixels is at least a distance which provides a direction at an angle relative to perpendicular to a front surface plane of the display device between the edge of the touch sensor electrode and the nearest edge of the sub-pixel which is equal to a maximum escape angle for light from the one of the plurality of sub-pixels.

15. The display device of claim 1, wherein a distance between an edge of the feedline and a nearest edge of one of the plurality of the sub-pixels is at least a distance which provides a direction at an angle relative to perpendicular to a front surface plane of the display device between the edge of the touch sensor electrode and the nearest edge of the sub-pixel which is equal to a maximum escape angle for light from the one of the plurality of sub-pixels.

16. The display device of claim 1, wherein a distance between an edge of the shield electrode and a nearest edge of one of the plurality of the sub-pixels is at least a distance which provides a direction at an angle relative to perpendicular to a front surface plane of the display device between the edge of the touch sensor electrode and the nearest edge of the sub-pixel which is equal to a maximum escape angle for light from the one of the plurality of sub-pixels.

17. The display device of claim 1, wherein the display panel is an emissive display panel.

18. The display device of claim 1, wherein a coverage of the first conductive and opaque material and the second conductive and opaque material of the touch sensor in a plan view of a feedline region is between about 50% and about 150% of a coverage of the first conductive and opaque material and the second conductive and opaque material of the touch sensor in a touch electrode region.

19. The display device of claim 1, wherein the a coverage of the first conductive and opaque material and the second conductive and opaque material of the touch sensor in a plan view of a feedline region is between about 80% and about 120% of the coverage of the first conductive and opaque material and the second conductive and opaque material of the touch sensor in a touch electrode region.

20. The display device of claim 1, wherein the feedline overlaps the shield electrode.

* * * * *